(12) United States Patent
Klein et al.

(10) Patent No.: US 12,247,693 B2
(45) Date of Patent: Mar. 11, 2025

(54) ROTATING JOINT FOR CROSSBAR LEVELING ADJUSTMENT

(71) Applicant: Humanscale Corporation, New York, NY (US)

(72) Inventors: Aaron Klein, Massapequa, NY (US); Robert Principe, Newfoundland, NJ (US); Ross Velazquez, Brooklyn, NY (US); Greg Allison, Allentown, PA (US); David Wong, New York, NY (US)

(73) Assignee: Humanscale Corporation, New York, NY (US)

( * ) Notice: Subject to any disclaimer, the term of this patent is extended or adjusted under 35 U.S.C. 154(b) by 0 days.

(21) Appl. No.: 18/536,965

(22) Filed: Dec. 12, 2023

(65) Prior Publication Data
US 2024/0110662 A1 Apr. 4, 2024

Related U.S. Application Data

(63) Continuation of application No. 17/876,912, filed on Jul. 29, 2022, now Pat. No. 11,841,107.

(51) Int. Cl.
| | |
|---|---|
| *F16M 11/12* | (2006.01) |
| *F16M 11/08* | (2006.01) |
| *F16M 11/10* | (2006.01) |

(52) U.S. Cl.
CPC .......... *F16M 11/126* (2013.01); *F16M 11/08* (2013.01); *F16M 11/105* (2013.01); *F16M 11/125* (2013.01)

(58) Field of Classification Search
CPC .... F16M 11/126; F16M 11/08; F16M 11/105; F16M 11/125; F16M 2200/063; F16M 2200/06; F16M 11/10; F16M 11/12; F16M 11/128; F16M 11/121; F16M 11/2035; F16M 11/2021; F16M 11/2028; F16M 11/2057; F16M 11/2064; F16M 11/2071; Y10T 403/32557; Y01T 403/32581

See application file for complete search history.

(56) References Cited

U.S. PATENT DOCUMENTS

| | | | | |
|---|---|---|---|---|
| 7,331,551 | B2 * | 2/2008 | Oddsen, Jr. ............ | F16M 11/24 361/679.55 |
| 2004/0256526 | A1 * | 12/2004 | Burns .................... | F16M 13/02 248/200 |
| 2007/0084978 | A1 * | 4/2007 | Martin ............... | F16M 11/2064 248/176.1 |
| 2007/0205340 | A1 * | 9/2007 | Jung .................... | F16M 11/105 248/917 |

(Continued)

OTHER PUBLICATIONS

PCT Application No. US23/28838; International Search Report and Written Opinion of the International Searching Authority for Applicant Humanscale Corporation dated Sep. 6, 2023.

*Primary Examiner* — Christopher Garft
(74) *Attorney, Agent, or Firm* — Jones Walker LLP

(57) ABSTRACT

A monitor mounting system which includes a crossbar having at least one monitor mounting bracket positioned thereon. A support arm is configured to adjust the vertical height of the crossbar and a pivot assembly is positioned between the support arm and the crossbar, with the pivot assembly configured to allow limited pivot adjustment of the crossbar in order to level the crossbar to the horizontal position.

20 Claims, 4 Drawing Sheets

(56) References Cited

U.S. PATENT DOCUMENTS

| | | | | |
|---|---|---|---|---|
| 2010/0128423 A1* | 5/2010 | Moscovitch | ............. | H04N 5/64 |
| | | | | 361/679.01 |
| 2011/0155868 A1* | 6/2011 | Sun | ........................ | F16M 11/08 |
| | | | | 248/125.7 |
| 2012/0024804 A1* | 2/2012 | Moscovitch | ........... | F16M 11/22 |
| | | | | 211/26 |
| 2015/0309532 A1* | 10/2015 | Sapper | ................... | F16M 11/24 |
| | | | | 211/26 |
| 2017/0202351 A1* | 7/2017 | Bowman | ................ | F16M 11/24 |
| 2018/0020825 A1* | 1/2018 | Hung | ................. | F16M 11/2014 |
| | | | | 108/31 |
| 2018/0340644 A1* | 11/2018 | Bowman | ............ | F16M 11/2064 |
| 2019/0353295 A1* | 11/2019 | Huang | ................. | F16M 11/046 |
| 2021/0270410 A1* | 9/2021 | Horvath | ............... | F16M 11/041 |

\* cited by examiner

ROTATING JOINT FOR CROSSBAR LEVELING ADJUSTMENT

CROSS REFERENCE TO RELATED APPLICATIONS/PRIORITY

This application is a continuation of U.S. Ser. No. 17/876,912 filed on Jul. 29, 2022, which issued as U.S. Pat. No. 11,841,107 on Dec. 12, 2023, and which is hereby incorporated by reference in its entirety.

BACKGROUND

With computer monitors become increasingly ubiquitous at work and home, individuals are spending ever greater portions of their waking hours viewing monitors. This means highly customizable adjustment of a monitor's position is necessary to reduce the strain of viewing monitors for long periods. FIG. 1 illustrates a convention monitor stand 100 supporting a monitor 101. Monitor stand 100 includes base 102, upright 103, and monitor mounting bracket 104. FIG. 1 suggests how monitor stand 100 allows monitor 101 to be adjusted with four degrees of freedom: (1) height in a vertical direction along upright 103, (2) swivel of upright 103 with respect to base 102, (3) tilt of monitor top and bottom edge toward and away from the user; and (4) pivot of the monitor in a plane containing the monitor. "Vertical" or "vertical direction" as used herein means a direction parallel to Earth's gravitational force. While a single monitor stand such as seen in FIG. 1 can adequately provide these four degrees of freedom, providing this degree of adjustability becomes more difficult as stands are expected to support two, three, or possibly more monitors.

SUMMARY

One embodiment of the invention is a monitor mounting system which includes a crossbar having at least one monitor mounting bracket positioned thereon. A support arm is configured to adjust the vertical height of the crossbar and a pivot assembly is positioned between the support arm and the crossbar, with the pivot assembly configured to allow limited pivot adjustment of the crossbar in order to level the crossbar to the horizontal position.

The above summary is not intended to describe each illustrated embodiment or every possible implementation. These and other features, aspects, and advantages of the present invention will become better understood with regard to the following description, appended claims, and accompanying drawings.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages in accordance with the present invention.

DETAILED DESCRIPTION

Figure 1:
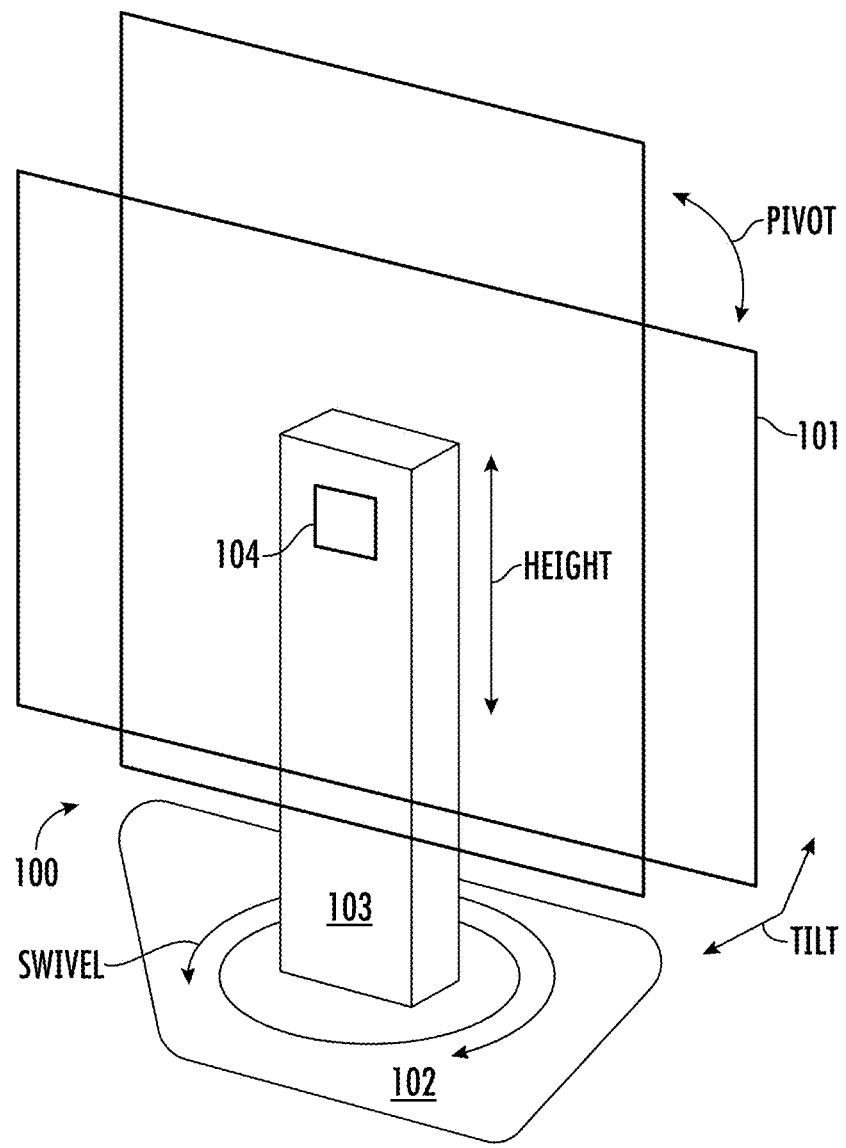
FIG. 1 is a perspective view of a prior art monitor stand.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Alternate embodiments may be devised without departing from the spirit or the scope of the invention. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

As used herein, the terms "a" or "an" are defined as one or more than one. The term "plurality," as used herein, is defined as two or more than two. The term "another," as used herein, is defined as at least a second or more. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including," "having," or "featuring," as used herein, are defined as comprising (i.e., open language). The term "coupled," as used herein, is defined as connected, although not necessarily directly, and not necessarily mechanically. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Where a numerical limitation is used, unless indicated otherwise by the context, "about" or "approximately" means the numerical value can vary by +/−5%, +/−10%, or in certain embodiments +/−15%, or possibly as much as +/−20%. Similarly, the term "substantially" will typically mean at least 85% to 99% of the characteristic modified by the term. For example, "substantially all" will mean at least 85%, at least 90%, or at least 95%, etc. Relational terms such as first and second, top and bottom, right and left, and the like may be used solely to distinguish one entity or action from another entity or action without necessarily requiring or implying any actual such relationship or order between such entities or actions.

Figure 2:
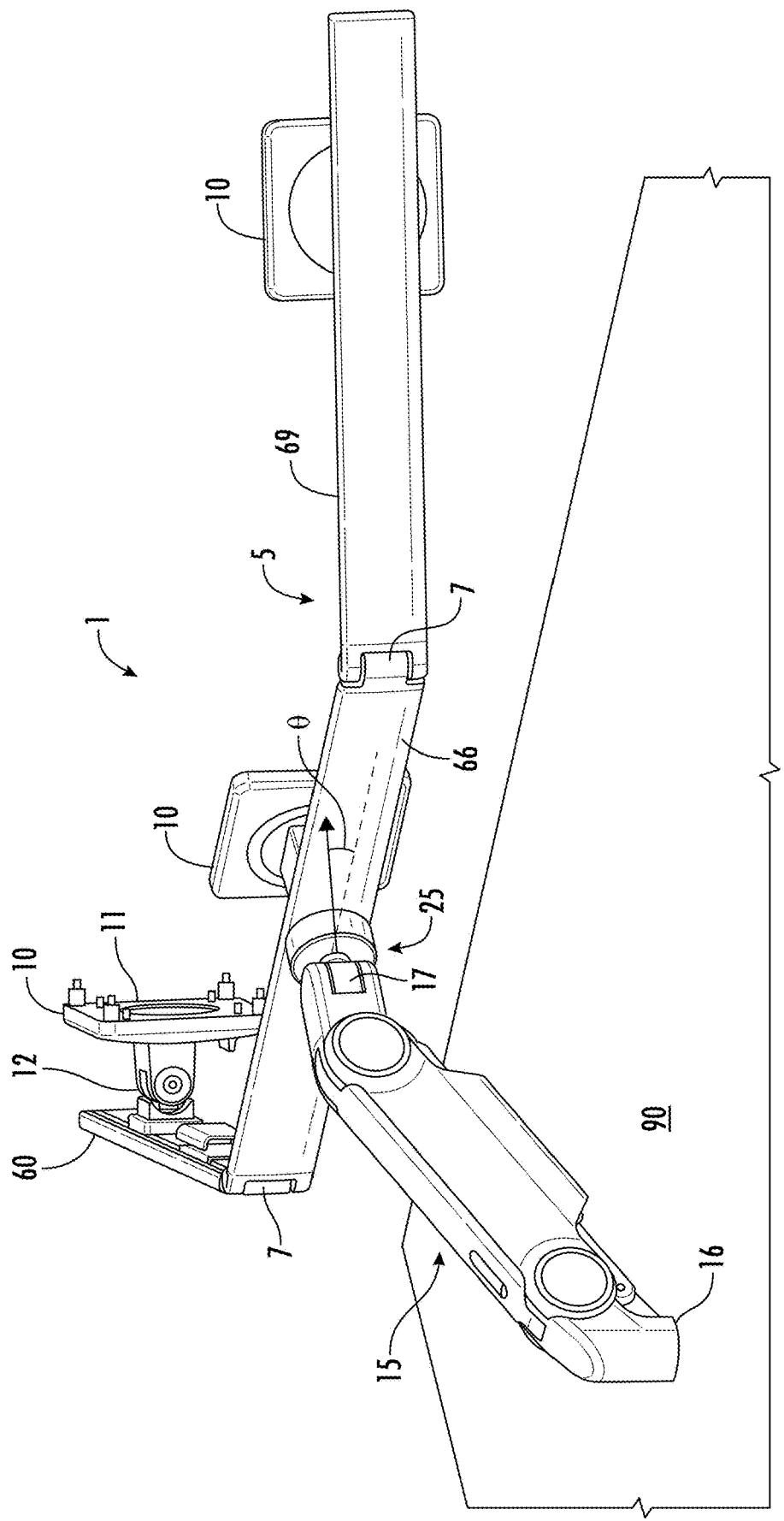
FIG. 2 is a perspective view of one embodiment of the present invention.

Described now are exemplary embodiments of the present invention. FIG. 2 illustrates one embodiment of the present invention, tilt adjustable monitor crossbar assembly 1, sometimes referred to simply as monitor mounting system 1. In this embodiment, the monitor mounting assembly 1 most generally includes a crossbar 5, a support arm 15, and a pivot assembly or pivot link 25 connected between crossbar 5 and support arm 15. In the FIG. 2 embodiment, crossbar 5 includes three crossbar segments 6a, 6b, and 6c, with hinges 7 connecting the interior ends of crossbar segments 6a and 6c to crossbar segment 6b and allowing for crossbar segments 6a and 6c to swing inward toward one another as suggested in FIG. 2. Typically, each crossbar segment 6 will have a monitor mounting bracket 10 attached thereto. In FIG. 2, the monitor mounting brackets include a mounting face 11 for attachment to the monitor and a hinged connection or tilt connector 12 allowing for altering of the tilt position of the monitor with respect to its crossbar segment 6. Although FIG. 2 illustrates a crossbar 5 formed of multiple hinged segments, other embodiments could employ a single segment crossbar.

FIG. 2 further shows the support arm 15 which is connected to the support surface 90 (e.g., a work desk) and suspends crossbar 5 via pivot assembly 25 above support surface 90. Although support arm 15 could be about any conventional or future developed support mechanism, the FIG. 2 embodiment illustrates a support arm available from Humanscale Corporation under the tradenames M8.1 and M10. Although not shown in FIG. 2, another arm may be positioned between the support surface and the base swivel connection 16 of support arm 15. The base swivel connection 16 will allow the support arm to rotate in the swivel direction and also an upper swivel fork 17 will operate in conjunction with the pivot assembly 25 to create a second swivel point. In the example of M8.1 or M10 support arms, the support arms include a weight compensating spring system which allows for change of the vertical position of support arm 15 (i.e., change of the vertical height of crossbar 5) while the user experiences little or no change in the force needed to adjust the height of the monitors mounted on crossbar 5. The construction and operation of the illustrated support arm 15 is more fully described in U.S. Pat. No. 10,480,709 which is incorporated by reference herein.

As suggested above, pivot assembly 25 provides the connection between crossbar 5 and support arm 15. FIGS. 3A to 4B illustrate one embodiment of pivot assembly 25. This embodiment of pivot assembly 25 will generally include pivot housing 26 which is integrally formed on one end with swivel ring 50 and is engaged on the opposite end by pivot core 35. Swivel ring 50 will include two bearing inserts 51 (best seen in FIG. 4B). Bearing inserts 51 may be formed of a low friction material such as polyoxymethylene (POM), also known as acetal, polyacetal, or polyformaldehyde. A pin (not shown) with an alignment key will extend through the upper swivel fork 17 of support arm 15 (see FIG. 2) and complete the swivel connection between swivel fork 17 and swivel ring 50. The bearing flexures 52 allow for a controlled precision fit between a rotation pin (not shown) and the contact surface of bearing inserts 51.

Figure 3A:
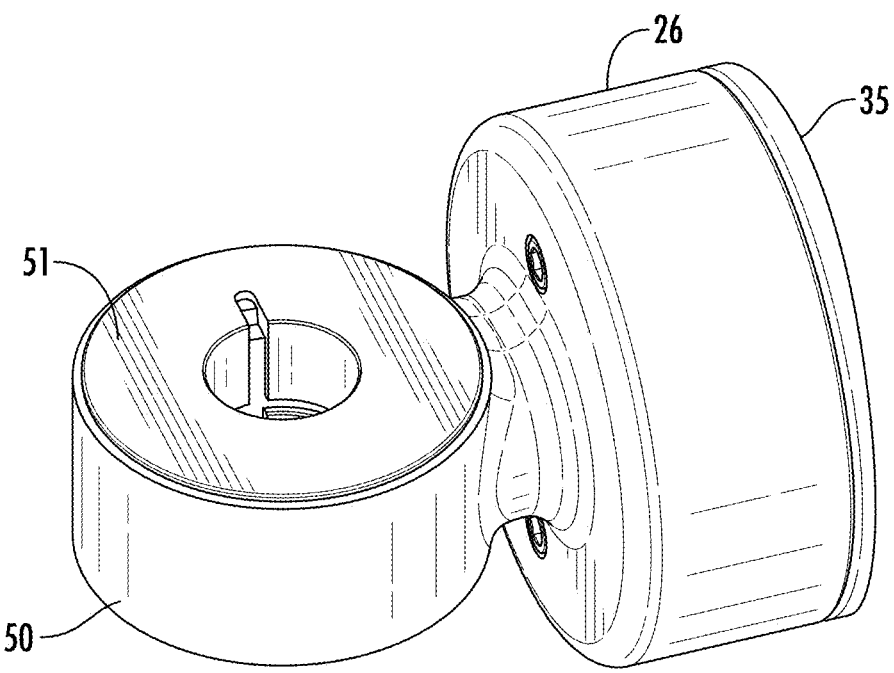
FIG. 3A is a perspective view of one embodiment of the pivot assembly.
Figure 3B:
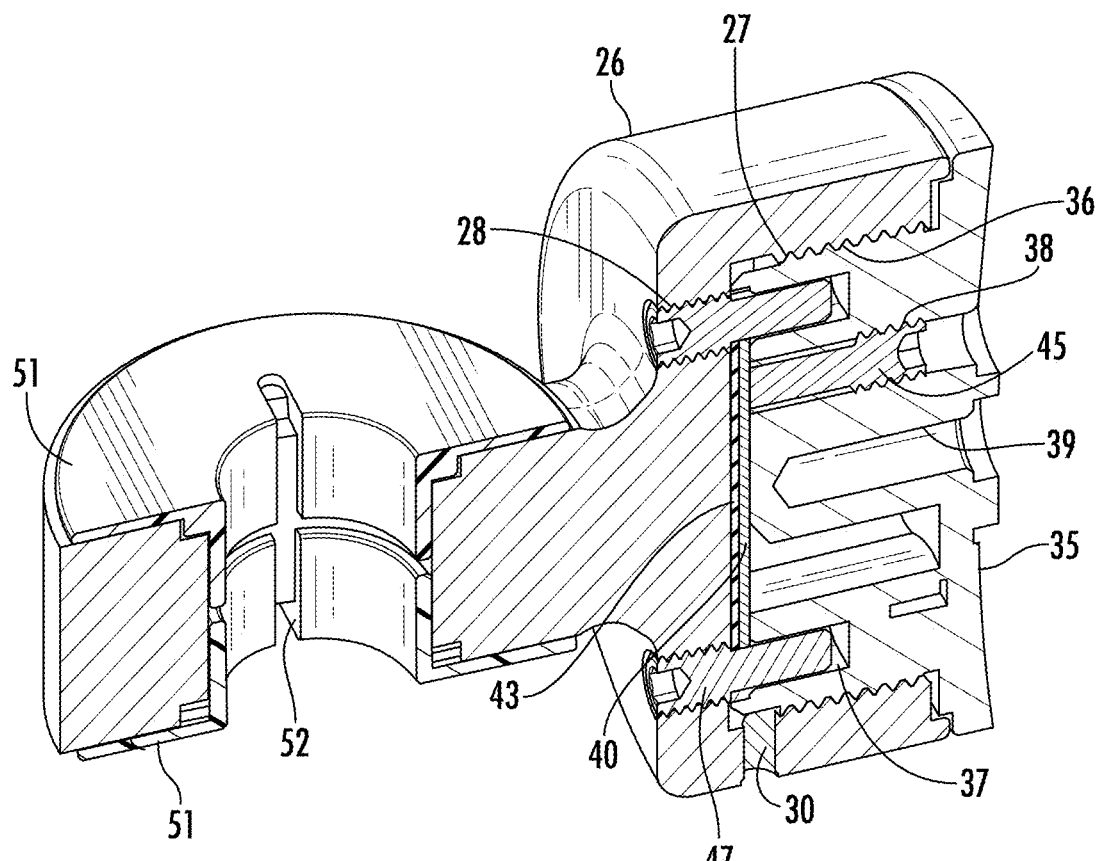
FIG. 3B is a cross-sectional view of the pivot assembly of FIG. 3A.
Figure 4A:
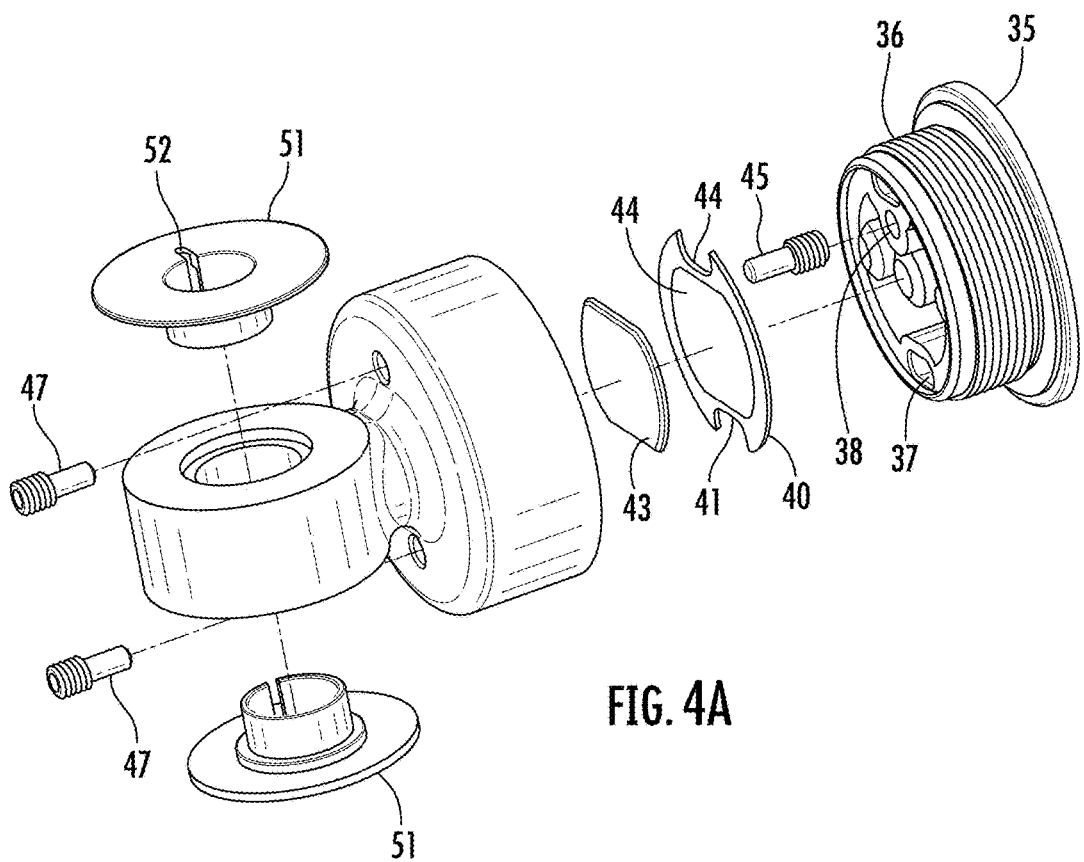
FIG. 4A is an exploded view of the pivot assembly from a first direction.
Figure 4B:
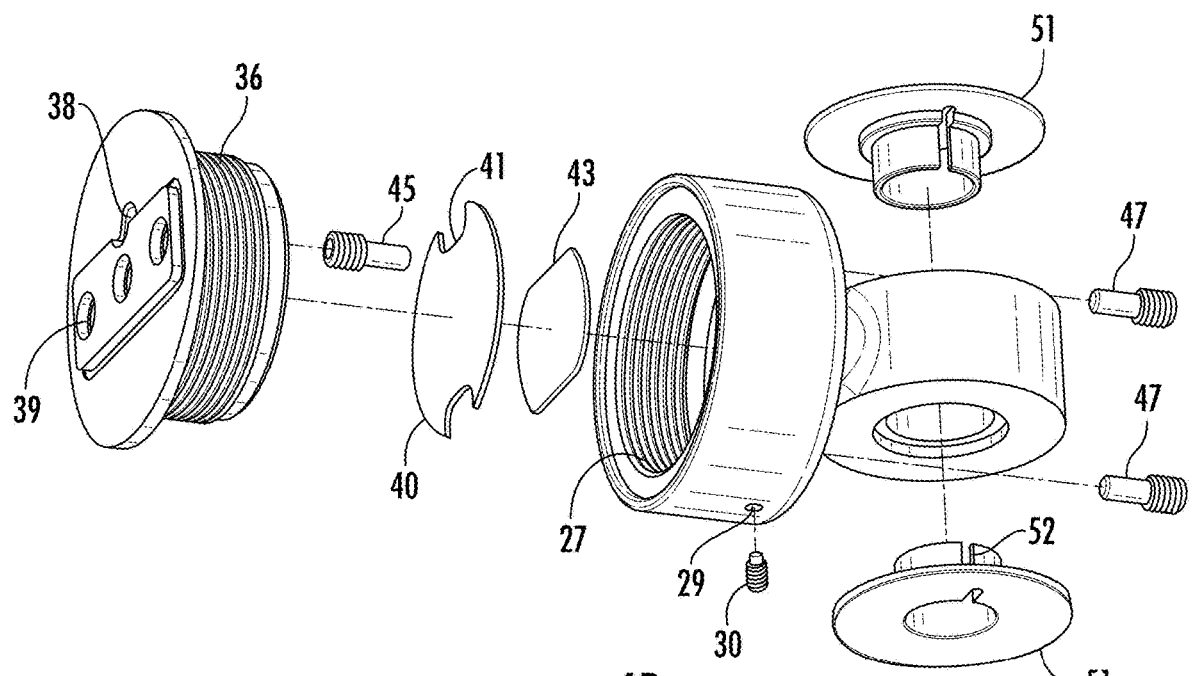
FIG. 4B is an exploded view of the pivot assembly from an opposing direction.

As best seen in FIG. 4B, pivot housing 26 is mainly a hollow body with internal threads 27 formed on the inner surface of pivot housing 26. A threaded set screw aperture 29 extends through the housing wall to accommodate set screw 30 which has sufficient length to extend into internal rotation surface of pivot core 35. The face of pivot housing 26 to which swivel ring 50 attaches (see FIG. 3B) includes the limit screw apertures 28 extending through this face, into the interior of pivot housing 26, and then into a controlled rotary slots (or "pivot slots") 37 in pivot core 35.

The internal threads 27 of pivot housing 26 will be engaged by the external threads 36 of pivot core 35 with set screw 30 able to engage external threads 36 in order to selectively lock the relative rotative positions between pivot housing 26 and pivot core 35. As seen in FIG. 3B, pivot core 35 includes the controlled rotary slots 37 formed on the inner face of pivot core 35. Pivot core 35 also includes friction pin aperture 38 extending through pivot core 35 and a series of crossbar mounting lug apertures 39 (better seen in FIG. 4B) formed in the external face of pivot core 35. As best seen viewing FIGS. 3B and 4A, the motion control plate (sometimes called an "anti-rotation plate") 40 and the compression plate 43 are positioned between the inner faces of pivot housing 26 and pivot core 35. FIG. 4A shows how the elliptically shaped motion control plate 40 will include opposing circumferential cutouts 41 and a plate groove or plate inset 44, which does not extend completely through motion control plate 40 and is shaped to accommodate compression plate 43. FIG. 3B best shows how motion control plate 40 and compression plate 43 are sandwiched between the inner faces of pivot housing 26 and pivot core 35. The plate inset 44 will ensure there is no relative movement between motion control plate 40 and compression plate 43. In one preferred embodiment, motion control plate 40 is formed of polyurethane foam and compression plate 43 is formed of acrylonitrile butadiene styrene. Angle limit screws 47 will extend through pivot housing 26, the circumferential cutouts 41 in motion control plate 40, and into the controlled rotary slots 37 of pivot core 35.

Viewing FIG. 4A, it can be envisioned how angle limit screws 47 will allow a limited relative rotation between pivot housing 26 and pivot core 35 based on the angular width of controlled rotary slots 37 and circumferential cutouts 41 (at least when set screw 30 in not engaging external threads 36 of pivot core 35). The resulting degree of pivot imparted to crossbar 5 is suggested by the angle θ seen in FIG. 2. The angle θ represents the degree of tilt (in one direction) of crossbar 5 relative to the swivel ring 50 fixed against tilt by upper swivel fork 17 of support arm 15. The maximum pivot of crossbar 5 (pivot in both directions) would be 2θ. In certain embodiments, the width of controlled rotary slots 37 and circumferential cutouts 41 are only wide enough to allow a maximum pivot of less than 15 degrees (θ=7.5 degrees or less), and more preferably a maximum pivot of 8 degrees (θ=4 degrees or less), between pivot housing 26 and pivot core 35. Returning to FIG. 3B, it may also be envisioned how the compression screw 45 engages motion control plate 40 and will tend to compress compression plate 43 against the inner face of pivot housing 26. It will be understood that advancing compression screw 45 into motion control plate 40 will increase the amount of torque necessary to cause rotation between pivot housing 26 and pivot core 35. In addition to enhancing friction within the system, motion control plate 40 provides a locating feature for assembly of the system.

Viewing FIG. 2, with compression screw 45 applying moderate force to compression plate 43, a user will be allowed to finely adjust the pivot position of crossbar 5 by applying moderate force to the outer monitors and overcoming the friction generated by compression plate 43 and motion control plate 40. However, when the user ceases applying force to the monitors, the friction is sufficient to resist the weight of the monitors correcting the user induced pivot. Thereafter, set screw 30 may be tightened to engage external threads 36 on pivot core 35 in order to more firmly lock the pivot position of crossbar 5. The use of compression screw 45 may be particularly useful when heavier monitors are being mounted, but there could be alternative embodiments which do not employ a compression screw 45. Similarly, while many embodiments employ motion control plate 40 and compression plate 43 to enhance the friction resisting free pivot motion of the crossbar, there could be alternative embodiments which eliminate motion control plate 40 and compression plate 43.

The foregoing description and accompanying drawings illustrate the principles, exemplary embodiments, and modes of operation of the invention. However, the invention should not be construed as being limited to the particular embodiments discussed above. Many modifications of the embodiments described herein will come to mind to one skilled in the art having the benefit of the teaching presented in the foregoing descriptions and the associated drawings. Accordingly, it should be appreciated that variations to those embodiments can be made by those skilled in the art without departing from the scope of the invention.

What is claimed is:

1. A monitor mounting system comprising:
   (a) a crossbar having at least one monitor mounting bracket connected thereto;
   (b) a support arm configured to adjust the vertical height of the crossbar;
   (c) a pivot assembly positioned between the support arm and the crossbar, wherein the pivot assembly comprises:
      (i) a pivot housing comprising: a pivot core positioned within the pivot housing; and a compression plate positioned between the pivot core and the pivot housing;
      (ii) a swivel ring attached to an exterior of the pivot housing; and
      (iii) a pivot stop positioned in the pivot housing and limiting pivot adjustment to fifteen or fewer degrees in each pivot direction, wherein the pivot stop includes anti-rotation pins engaging opposing circumferential slots formed on an inner face of the pivot core.

2. The monitor mounting system of claim 1, wherein the circumferential slots have an arc of less than fifteen degrees.

3. The monitor mounting system of claim 1, wherein the anti-rotation pins are threaded through apertures in the pivot housing and extend into the circumferential slots of the pivot core.

4. The monitor mounting system of claim 1, wherein the pivot stop further comprises a motion control plate, wherein the motion control plate is an approximately circular plate with opposing circumferential cutouts, wherein the circumferential cutouts have an arc of less than fifteen degrees.

5. The monitor mounting system of claim 4, wherein the anti-rotation pins are threaded through apertures in the pivot housing, then pass through the circumferential cutouts of the motion control plate, and finally extend into the circumferential slots of the pivot core.

6. The monitor mounting system of claim 1, wherein an outer face of the pivot core includes at least two threaded apertures configured to receive mounting screws.

7. The monitor mounting system of claim 1, wherein the swivel ring further includes two bearing inserts.

8. The monitor mounting system of claim 1, wherein the crossbar has at least two monitor mounting brackets positioned thereon, and the monitor mounting brackets are attached to the crossbar with a tilt connector.

9. The monitor mounting system of claim 8, wherein the crossbar includes a central segment and two outer segments which form hinge connections to the central segment.

10. A monitor mounting system comprising:
    (a) a crossbar having at least one monitor mounting bracket positioned thereon;
    (b) a support arm configured to adjust the vertical height of the crossbar;
    (c) a pivot assembly connecting the crossbar to the support arm, the pivot assembly configured to allow limited pivot adjustment of the crossbar relative to the support arm, wherein the pivot assembly comprises:
       (i) a pivot housing comprising a central orifice, a first threaded aperture, and a second threaded aperture;
       (ii) a pivot core positioned within the central orifice of the pivot housing, wherein an inner face of the pivot core includes a first circumferential slot and a second circumferential slot;
       (iii) a compression plate positioned between the pivot core and the pivot housing;
       (iv) first and second angle limit screws, wherein the first angle limit screw threadingly engages the first threaded aperture and then extends into the first circumferential slot, and wherein the second angle limit screw threadingly engages the second threaded aperture and then extends into the second circumferential slot; and
       (v) a swivel ring attached to an exterior of the pivot housing.

11. The monitor mounting system of claim 10, wherein the pivot assembly further comprises a motion control plate positioned between the pivot core and the pivot housing, the motion control plate having a first circumferential cutout and a second circumferential cutout.

12. The monitor mounting system of claim 11, wherein the first angle limit screw extends through the first circumferential cutout of the motion control plate, and wherein the second angle limit screw extends through the second circumferential cutout of the motion control plate.

13. The monitor mounting system of claim 10, wherein the pivot core comprises external screw threads configured to engage internal screw threads of the pivot housing.

14. The monitor mounting system of claim 10, wherein the circumferential cutouts have an arc of less than 15 degrees.

15. The monitor mounting system of claim 10, wherein an outer face of the pivot core includes at least two threaded apertures configured to receive mounting screws.

16. The monitor mounting system of claim 10, wherein the swivel ring further includes two bearing inserts.

17. The monitor mounting system of claim 10, wherein the support arm is a dynamic support arm.

18. The monitor mounting system of claim 10, wherein the crossbar has at least two monitor mounting brackets positioned thereon, and the monitor mounting brackets are attached to the crossbar with a tilt connector.

19. The monitor mounting system of claim 10, wherein the crossbar includes a central segment and two outer segments which form hinge connections to the central segment.

20. The monitor mounting system of claim 10, wherein the support arm is attached to a base with a swivel connection.

* * * * *